US008886439B2

(12) United States Patent
Dölker

(10) Patent No.: US 8,886,439 B2
(45) Date of Patent: Nov. 11, 2014

(54) METHOD FOR THE CONTROL AND REGULATION OF AN INTERNAL COMBUSTION ENGINE

(75) Inventor: Armin Dölker, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 435 days.

(21) Appl. No.: 13/505,233

(22) PCT Filed: Oct. 20, 2010

(86) PCT No.: PCT/EP2010/006418
§ 371 (c)(1),
(2), (4) Date: May 11, 2012

(87) PCT Pub. No.: WO2011/050920
PCT Pub. Date: May 5, 2011

(65) Prior Publication Data

US 2012/0215424 A1 Aug. 23, 2012

(30) Foreign Application Priority Data

Oct. 30, 2009 (DE) ........................ 10 2009 051 390

(51) Int. Cl.
*G06F 19/00* (2011.01)
*F02D 41/22* (2006.01)
*F02B 75/22* (2006.01)
*F02D 41/38* (2006.01)

(52) U.S. Cl.
CPC .............. *F02D 41/222* (2013.01); *F02B 75/22* (2013.01); *F02D 41/221* (2013.01); *F02D 41/3854* (2013.01); *F02D 41/3863* (2013.01); *F02D 2041/223* (2013.01); *F02D 2041/224* (2013.01); *F02D 2041/3881* (2013.01); *F02D 2200/0602* (2013.01)
USPC ............ 701/101; 701/103; 123/457; 123/480

(58) Field of Classification Search
CPC .. F02D 41/1401; F02D 41/30; F02M 37/0029
USPC .......... 701/101, 103, 114, 115; 123/456, 457, 123/462, 463, 478, 480
See application file for complete search history.

(56) References Cited

U.S. PATENT DOCUMENTS

| | | | |
|---|---|---|---|
| 5,433,182 | A | 7/1995 | Augustin et al. |
| 5,954,032 | A | 9/1999 | Augustin et al. |
| 7,010,415 | B2 | 3/2006 | Dölker |
| 7,017,549 | B2 | 3/2006 | Doelker |

(Continued)

FOREIGN PATENT DOCUMENTS

| | | | |
|---|---|---|---|
| DE | 4335171 | C1 | 5/1995 |
| DE | 19651671 | A1 | 6/1998 |

(Continued)

*Primary Examiner* — John Kwon
(74) *Attorney, Agent, or Firm* — Lucas & Mercanti, LLP; Klaus P. Stoffel

(57) ABSTRACT

Disclosed is a method for the control and regulation of an internal combustion engine (1), comprising an independent common rail system on the A-side and an independent common rail system on the B-side. During normal operation, the rail pressure (pCR(A), pCR(B)) is controlled in each common rail system via a low pressure-side suction throttle (4A, 4B) as the first pressure-adjusting element in a rail pressure control loop and, at the same time, the rail pressure (pCR(A), pCR(B)) is subjected to a rail pressure disturbance variable via a high pressure-side pressure control valve (11A, 11B) as a second pressure-adjusting element, by means of which a pressure control valve volume flow is redirected via the high pressure-side pressure control valve (11A, 11B) from the rail (6A, 6B) into a fuel tank (2). The method is characterized in that a first emergency operation is implemented for the common rail system in question when a defective rail pressure sensor (8A, 8B) and a non-defective pressure control valve (11A, 11B) have been detected in said common rail system, while a second emergency operation is implemented for the common rail system in question when a defective rail pressure sensor (8A, 8B) and simultaneously a defective pressure control valve (11A, 11B) have been detected in said common rail system, and wherein the normal operation is implemented for the other, non-defective common rail system.

10 Claims, 6 Drawing Sheets

(56) References Cited

U.S. PATENT DOCUMENTS

| | | | | |
|---|---|---|---|---|
| 7,451,038 | B2 | 11/2008 | Kosiedowski et al. | |
| 2012/0097134 | A1 | 4/2012 | Dölker | |
| 2012/0221226 | A1* | 8/2012 | Dolker | 701/103 |
| 2012/0226428 | A1* | 9/2012 | Dolker | 701/103 |
| 2012/0265424 | A1* | 10/2012 | Dolker | 701/104 |

FOREIGN PATENT DOCUMENTS

| | | | |
|---|---|---|---|
| DE | 19757594 | A1 | 7/1999 |
| DE | 10157641 | A1 | 10/2004 |
| DE | 10330466 | | 10/2004 |
| DE | 102006040441 | A | 2/2008 |
| DE | 102007000742 | A | 4/2008 |
| DE | 102007034317 | Y | 1/2009 |
| DE | 102007034217 | A1 | 2/2009 |
| DE | 102009031527 | | 11/2010 |
| WO | 03046357 | Y | 6/2003 |
| WO | 2009013059 | | 1/2009 |

* cited by examiner

| Switch | Normal Operating Mode | Emergency Operating A-Side (NB1(A))<br>Pressure Sensor is Defective, Pressure Control Valve is Not Defective | Emergency Operating A-Side (NB2(A))<br>Pressure Sensor is Defective and Pressure Control Valve Is Defective | Emergency Operating B-Side (NB1(B))<br>Pressure Sensor is Defective, Pressure Control Valve is Not Defective | Emergency Operating B-Side (NB2(B))<br>Pressure Sensor is Defective and Pressure Control Valve Is Defective |
|---|---|---|---|---|---|
| **S1A** | 1 | 2 | 1 | - | - |
| **S1B** | 1 | - | - | 2 | 1 |
| **S2A** | 1 | 1 | 2 | - | - |
| **S2B** | 1 | - | - | 1 | 2 |
| **S3A** | 1 | 2 | 2 | - | - |
| **S3B** | 1 | - | - | 2 | 2 |
| **S4A** | 1 | 2 | 2 | - | - |
| **S4B** | 1 | - | - | 2 | 2 |
| **S5A** | 1 | 2 | 2 | - | - |
| **S5B** | 1 | - | - | 2 | 2 |
| **S6A** | 1 | 1 | 1 | - | 1 or 2 |
| **S6B** | 1 | - | 1 or 2 | 1 | 1 |

Fig. 5

| lfd. Nr. | Defective Pressure Sensor on A-Side | Cable Break Pressure Control Valve on A-Side | Defective Pressure Sensor on B-Side | Cable Break Pressure Control Valve on B-Side | pA | pB |
|---|---|---|---|---|---|---|
| 1 | 0 | 0 | 0 | 0 | pIST(A) | pIST(B) |
| 2 | 1 | 0 | 0 | 0 | pSLKF | pIST(B) |
| 3 | 0 | 0 | 1 | 0 | pIST(A) | pSLKF |
| 4 | 1 | 0 | 1 | 0 | pSLKF | pSLKF |
| 5 | 0 | 1 | 0 | 0 | pIST(A) | pIST(B) |
| 6 | 0 | 1 | 1 | 0 | pIST(A) | pSLKF |
| 7 | 1 | 1 | 0 | 0 | pM | pIST(B) |
| 8 | 1 | 1 | 1 | 0 | pM | pSL |
| 9 | 0 | 0 | 0 | 1 | pIST(A) | pIST(B) |
| 10 | 0 | 0 | 1 | 1 | pIST(A) | pM |
| 11 | 1 | 0 | 0 | 1 | pSLKF | pIST(B) |
| 12 | 1 | 0 | 1 | 1 | pSL | pM |
| 13 | 0 | 1 | 0 | 1 | pIST(A) | pIST(B) |
| 14 | 0 | 1 | 1 | 1 | pIST(A) | pM |
| 15 | 1 | 1 | 0 | 1 | pM | pIST(B) |
| 16 | 1 | 1 | 1 | 1 | pM | pM |

0: Not Defective 1: Defective

Fig. 6

METHOD FOR THE CONTROL AND REGULATION OF AN INTERNAL COMBUSTION ENGINE

The present application is a 371 of International application PCT/EP2010/006418, filed Oct. 20, 2010, which claims priority of DE 10 2009 051 390.6, filed Oct. 30, 2009, the priority of these applications is hereby claimed and these applications are incorporated herein by reference.

BACKGROUND OF THE INVENTION

The invention concerns a method for the open-loop and closed-loop control of an internal combustion engine with an independent A-side common rail system and an independent B-side common rail system, in which in normal operating mode, the rail pressure is automatically controlled in each common rail system by a suction throttle on the low-pressure side as a first pressure regulator in a closed-loop rail pressure control system, and at the same time, the rail pressure is acted upon with a rail pressure disturbance variable by means of a pressure control valve on the high-pressure side as a second pressure regulator by virtue of the fact that a pressure control valve volume flow is redirected from the rail into a fuel tank by the pressure control valve on the high-pressure side.

In an internal combustion engine with a common rail system, the quality of combustion is critically determined by the pressure level in the rail. Therefore, in order to stay within legally prescribed emission limits, the rail pressure is automatically controlled. A closed-loop rail pressure control system typically comprises a comparison point for determining a control deviation, a pressure controller for computing a control signal, the controlled system, and a software filter in the feedback path for computing the actual rail pressure from the raw values of the rail pressure. The control deviation in turn is computed as the difference between the set rail pressure and the actual rail pressure. The controlled system comprises the pressure regulator, the rail, and the injectors for injecting the fuel into the combustion chambers of the internal combustion engine. For example, DE 103 30 466 B3 describes a common rail system of this type, in which the pressure controller acts on a suction throttle arranged on the low-pressure side by means of a control signal. The suction throttle in turn sets the admission cross section to the high-pressure pump and thus the volume of fuel delivered.

The unprepublished application DE 10 2009 031 527.6 also describes a common rail system with automatic control of the rail pressure by means of a suction throttle on the low-pressure side as a first pressure regulator. This automatic pressure control in the common rail system is supplemented by a pressure control valve on the high-pressure side as a second pressure regulator, by which pressure control valve volume flow is redirected from the rail into the fuel tank. A constant leakage of, for example, 2 liters/minute is reproduced in the low-load range by means of activation of the pressure control valve. Under normal operating conditions, on the other hand, no fuel is redirected from the rail. The pressure control valve volume flow is determined on the basis of a set volume flow with a static and a dynamic component. In the computation of the dynamic component and the computation of the control signal for the closed-loop rail pressure control system, the actual rail pressure is a critical input variable. Therefore, a defective rail pressure sensor or an error in the signal acquisition of the rail pressure results in a false actual rail pressure and causes faulty activation of both the suction throttle as the first pressure regulator and the pressure control valve as the second pressure regulator. The cited document fails to provide any fault safeguard in the event of failure of the rail pressure sensor.

DE 10 2006 040 441 B3 describes a common rail system with closed-loop pressure control, in which a passive pressure control valve is provided as a protective measure against excessively high rail pressure, for example, after a cable break in the power supply to the suction throttle. If the rail pressure rises above a critical value, for example, 2400 bars, the pressure control valve opens. The fuel is then redirected from the rail to the fuel tank through the open pressure control valve. With the pressure control valve open, a pressure level develops in the rail which depends on the injection quantity and the engine speed. Under idling conditions, this pressure level is about 900 bars, but under a full load, it is about 700 bars.

DE 10 2007 034 317 A1 describes an internal combustion engine with an independent A-side common rail system and an independent B-side common rail system, which are identical in structure. The two common rail systems are hydraulically decoupled from each other and therefore allow independent closed-loop control of the A-side and B-side rail pressure. Pressure fluctuations in the rails are reduced by the separate closed-loop control. Correct closed-loop rail pressure control requires properly operating rail pressure sensors. The failure of one rail pressure sensor or both rail pressure sensors in the specified system results in an undefined state of closed-loop pressure control and can produce a critical state of the internal combustion engine, since the cited document fails to indicate any fault safeguards.

SUMMARY OF THE INVENTION

Therefore, the objective of the invention is to provide more reliable closed-loop rail pressure control in an internal combustion engine with an independent A-side common rail system and an independent B-side common rail system as well as a pressure control valve and a passive pressure control valve.

This objective is achieved by a method for the open-loop and closed-loop control of an internal combustion engine.

If, for example, a defective A-side rail pressure sensor and a nondefective pressure control valve were detected in the A-side common rail system, then a first emergency operating mode is set for the A-side common rail system, while normal operating mode continues to be set for the correctly operating B-side common rail system. In the first emergency operating mode, the A-side pressure control valve and the A-side suction throttle are activated in the A-side common rail system as a function of the same setpoint value. If both the rail pressure sensor and the pressure control valve fail in the A-side common rail system, then a second emergency operating mode is set for the A-side common rail system. In the second emergency operating mode, the suction throttle in the A-side common rail system is activated in such a way that the rail pressure is successively increased until the passive pressure control valve responds. If the A-side common rail system is operating correctly, and defects occur in the B-side common rail system, an analogous procedure is followed.

To improve quiet running in the second emergency operating mode, a refinement of the invention provides that when the second emergency operating mode is set for the A-side common rail system, the set rail pressure of the correctly operating B-side common rail system is set to a constant emergency operation rail pressure. On the other hand, when the second emergency operating mode is set for the B-side common rail system, then, in analogous fashion, the set rail pressure of the correctly operating A-side common rail system is set to this emergency operation rail pressure.

In normal operating mode, the energization time of the injectors is computed by an injector input-output map as a function of a set injection quantity and the actual rail pressure. In this regard, a switch is made, as a function of the firing order, from the A-side actual rail pressure to the B-side actual rail pressure as the input variable of the injector input-output map. If the first emergency operating mode for the A-side common rail system is now set, while the B-side common rail system is operating correctly, a set input-output map rail pressure is used instead of the A-side actual rail pressure. Similarly, if the first emergency operating mode for the B-side common rail system is set, while the A-side common rail system is operating correctly, the set input-output map rail pressure is used as the input variable instead of the B-side actual rail pressure. When the second emergency operating mode for the A-side common rail system is set, a rail pressure mean value is set as the input variable for the injector input-output map. The rail pressure mean is set, for example, at 800 bars. This pressure value corresponds to the average value of the pressure range that develops when the passive pressure control valve is opened.

In the first emergency operating mode, the rail pressure can still be adjusted with sufficiently good approximation with the aid of the pressure control valve. Since in this case the energization time of the injectors is also computed with a high degree of accuracy, the affected rail makes a maximal contribution to the output of the engine with only insignificantly higher emission values. The pressure control valve thus allows redundancy after failure of the rail pressure sensor. In the second emergency operating mode, stable engine operation can still be produced by the redirection of the fuel by means of the passive pressure control valve. Therefore, double redundancy is present.

BRIEF DESCRIPTION OF THE DRAWING

The figures illustrate a preferred embodiment of the invention.

FIG. 5 is a first table.

FIG. 6 is a second table.

DETAILED DESCRIPTION OF THE INVENTION

Figure 1:
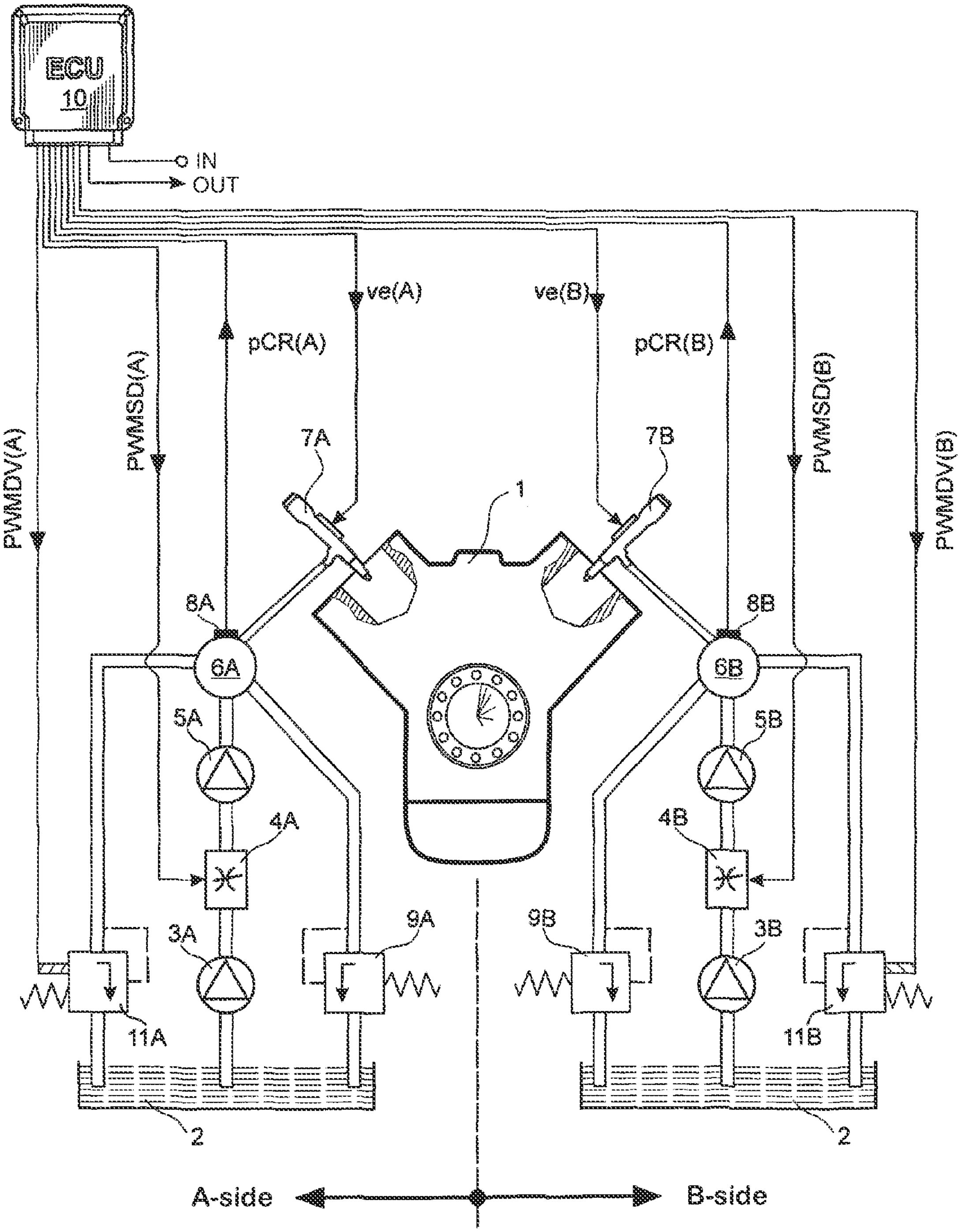
FIG. 1 is a system diagram.

FIG. 1 shows a system diagram of an electronically controlled V-type internal combustion engine 1 with an independent common rail system on the A side and an independent common rail system on the B side. The A-side and B-side common rail systems are identical in structure and are hydraulically separated from each other. In the description which follows, the components on the A side are identified by reference numbers with the suffix A, and the components on the B side are identified by reference numbers with the suffix B.

The common rail system on the A side comprises the following mechanical components: a low-pressure pump 3A for pumping fuel from a fuel tank 2, a suction throttle 4A arranged on the low-pressure side as a first pressure regulator for controlling the volume flow, a high-pressure pump 5A, a rail 6A, and injectors 7A for injecting fuel into the combustion chambers of the internal combustion engine 1. Optionally, the common rail system can also be realized with individual accumulators, in which case an individual accumulator is then integrated, for example, in the injector 7A as additional buffer volume. To protect against an impermissibly high pressure level in the rail 6A, a passive pressure control valve 9A is provided, which opens, for example, at a rail pressure of 2400 bars and, in its open state, redirects the fuel from the rail 6A into the fuel tank 2. The A-side common rail system is supplemented by an electrically controllable pressure control valve 11A, by which an adjustable volume flow of fuel is redirected into the tank. In the remainder of the text, this fuel volume flow is denoted the pressure control valve volume flow.

The internal combustion engine 1 is controlled by an electronic engine control unit (ECU) 10, which contains the usual components of a microcomputer system, for example, a microprocessor, interface adapters, buffers, and memory components (EEPROM, RAM). Operating characteristics that are relevant to the operation of the internal combustion engine 1 are applied in the memory components in the form of input-output maps/characteristic curves. The electronic control unit 10 uses these to compute the output variables from the input variables. FIG. 1 shows the following input variables of the electronic engine control unit 10 as examples: an A-side rail pressure pCR(A), a B-side a pCR(B), and an input variable IN. The A-side rail pressure pCR(A) is detected by an A-side rail pressure sensor 8A, and the B-side rail pressure pCR(B) is detected by a B-side rail pressure sensor 8B. The input variable IN is representative of the other input signals, for example, an engine speed or an engine power output desired by the operator. The illustrated output variables of the electronic control unit 10 are a PWM signal PWMSD(A) for controlling the A-side suction throttle 4A, a power-determining signal ve(A) for controlling the A-side injectors 7A, a PWM signal PWMSD(B) for controlling the B-side suction throttle 4B, a power-determining signal ve(B) for controlling the B-side injectors 7B, a PWM signal PWMDV(A) for controlling the A-side pressure control valve 11A, a PWM signal PWMDV(B) for controlling the B-side pressure control valve 11B, and an output variable OUT. The latter represents additional control signals for automatically controlling the internal combustion engine 1, for example, a control signal for controlling an EGR valve. The characterizing feature of the present embodiment of the invention is the mutually independent closed-loop control of the A-side rail pressure pCR(A) and the B-side rail pressure pCR(B).

Figure 2:
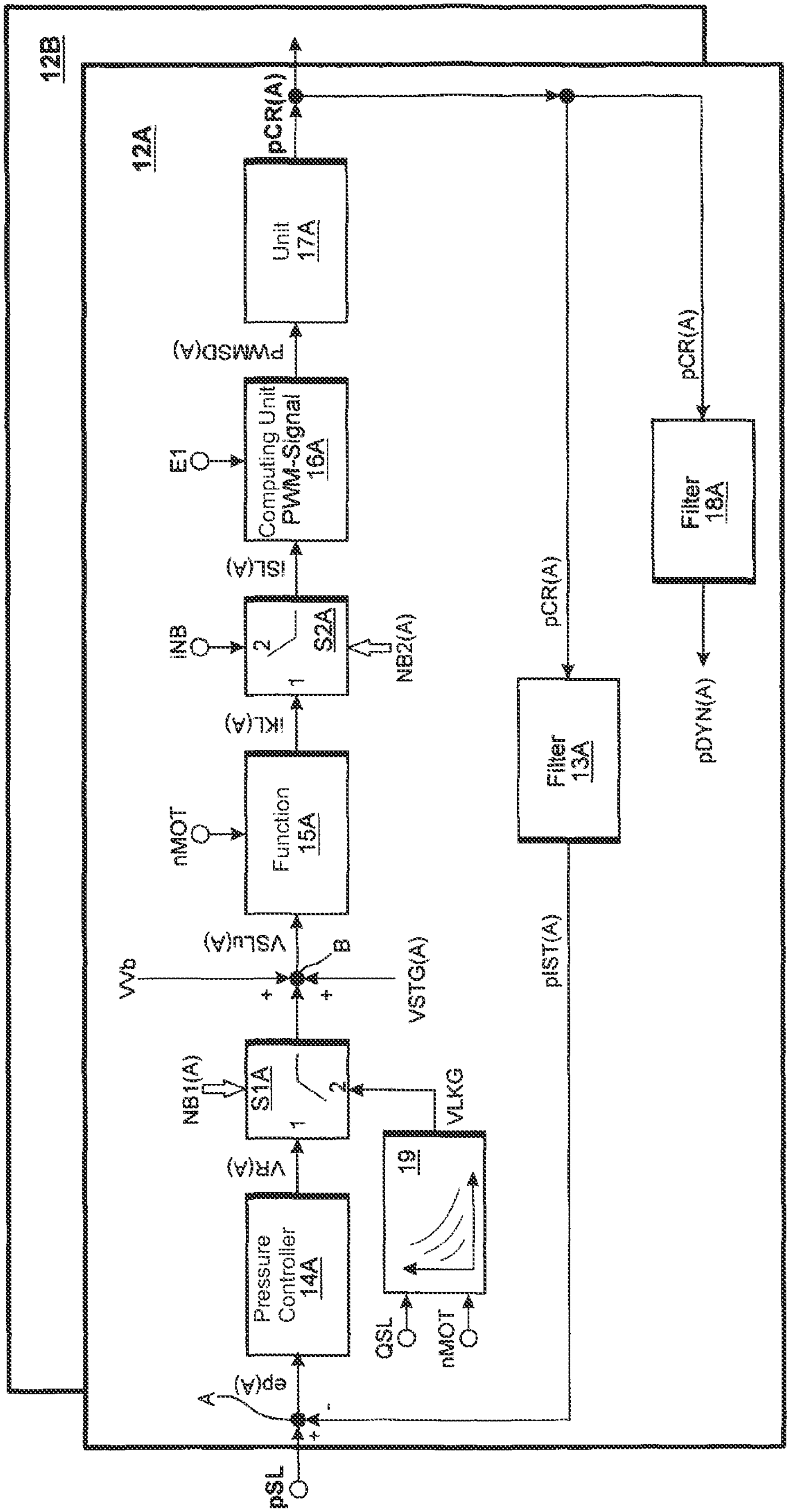
FIG. 2 shows the closed-loop rail pressure control systems.

FIG. 2 shows the A-side closed-loop rail pressure control system 12A for the closed-loop control of the A-side rail pressure pCR(A) and the B-side closed-loop rail pressure control system 12B. The A-side closed-loop rail pressure control system and the B-side closed-loop rail pressure control system are identical in structure, so that the description of the A-side closed-loop rail pressure control system applies equally to the B-side closed-loop rail pressure control system.

The input variables of the A-side closed-loop rail pressure control system 12A are: a set rail pressure pSL, a set consumption VVb, a rail pressure disturbance variable VSTG (A), the engine speed nMOT, a signal NB1(A), a signal NB2 (A), an emergency operation current value iNB, and an input variable E1. The input variable E1 combines a PWM base frequency, the battery voltage and the ohmic resistance of the suction throttle coil with lead-in wire, which enter into the computation of the PWM signal. The signal NB1(A) corresponds to the first emergency operating mode, which is set when there is a defective A-side rail pressure sensor and a properly operating A-side pressure control valve of the A-side common rail system. The signal NB2(A) corresponds to the second emergency operating mode, which is set when there is a defective A-side rail pressure sensor and at the same time a defective A-side pressure control valve of the A-side common rail system. The output variable of the A-side closed-loop rail pressure control system 12A is the raw value of the A-side rail pressure pCR(A). Normal operating mode will now be described, in which the switches S1A and S2A are in position 1.

Figure 3:
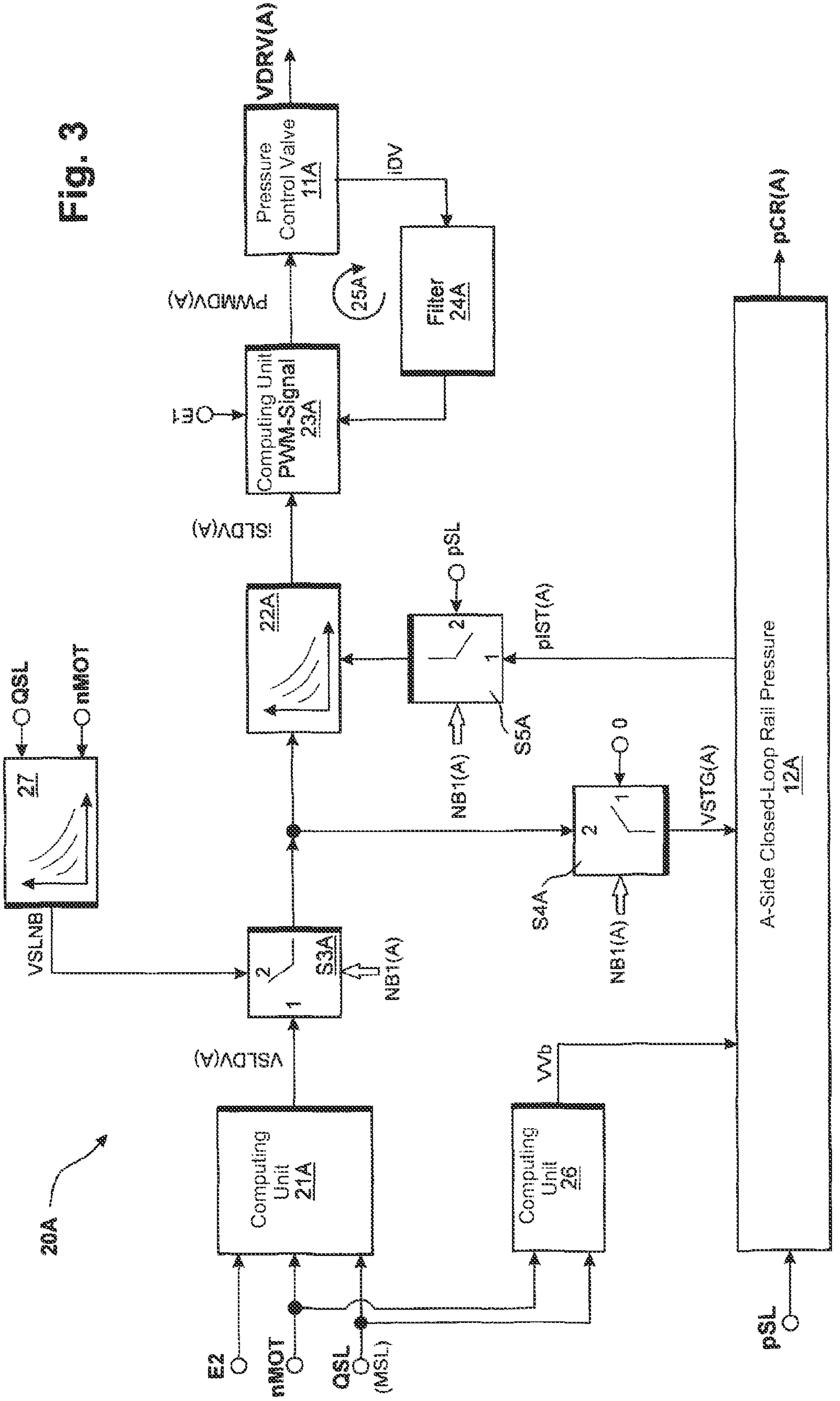
FIG. 3 shows the A-side closed-loop rail pressure control system with open-loop control of the pressure control valve.

A filter 13A uses the raw values of the rail pressure pCR(A) to compute the actual rail pressure pIST(A). In addition, a filter 18A uses the raw values of the rail pressure pCR(A) to compute a dynamic rail pressure pDYN(A), which enters into the computation of the actuating variable of the pressure control valve. The filter 181 has a smaller phase distortion than the filter 13A. The actual rail pressure pIST(A) is then compared with the set rail pressure pSL at a summation point A, and a control deviation ep(A) is obtained from this comparison. A correcting variable is computed from the control deviation ep(A) by a pressure controller 14A. The correcting variable represents a controller volume flow VR(A) with the physical unit of liters/minute. The computed set consumption VVb and the rail pressure disturbance variable VSTG(A) are added to the controller volume flow VR(A) at a summation point B. The set consumption VVb is computed as a function of a set injection quantity and the engine speed (FIG. 3). In normal operating mode, the rail pressure disturbance variable VSTG(A) is zero (VSTG(A)=0 liters/minute). The result of the addition represents an unlimited A-side set volume flow VSLu(A), which is the input variable of a functional block 15A, in which a limiter and a pump characteristic curve are combined. The unlimited set volume flow VSLu(A) is limited by the limiter as a function of the engine speed nMOT, and an electric current iKL(A) is computed by the pump characteristic curve. The pump characteristic curve is realized in such a form that a decreasing current iKL(A) is assigned to an increasing set volume flow. In normal operating mode, the switch S2A is in position 1, so that the set current iSL(A) corresponds to the current iKL(A) computed by the functional block 15A. The set current iSL(A) is one of the input variables of the PWM signal computing unit 16A. A PWM signal PWMSD(A) is computed by the computing unit 16A as a function of the set current iSL(A). The signal PWMSD (A) activates the solenoid of the A-side suction throttle. The displacement of the magnetic core is varied in this way, so that the delivery flow of the A-side high-pressure pump is freely controlled. For safety reasons, the A-side suction throttle is open in the absence of current and with increasing PWM value is caused to move in the direction of the closed position. The A-side suction throttle, the A-side high-pressure pump, and the A-side rail are combined in the unit 17A. A closed-loop current control system can be subordinate to the activation of the A-side suction throttle. In this closed-loop current control system, the suction throttle current is detected as the controlled variable. The A-side rail pressure pCR(A) produced by the high-pressure pump in the A-side rail is then detected by the A-side rail pressure sensor. The A-side closed-loop rail pressure control system is thus closed.

If a defective rail pressure sensor (FIG. 1: 8A) is now detected, correct computation of the control deviation ep and the controller volume flow VR(A) is no longer possible. Therefore, the first emergency operating mode for the A-side common rail system is set, provided that the A-side pressure control valve is not simultaneously defective. Further explanation will now be given in conjunction with FIG. 5, which shows the switch positions for the individual operating modes. In the first emergency operating mode NB1(A) of the A-side common rail system, the switch S1A is switched from position 1 to position 2, while switch S2A remains unchanged in position 1. In position 2 of the switch S1A, the pressure controller 14A is no longer determining. The output of the switch S1A is now either the value zero (0 liters/minute) or, optionally, as shown, the value of a leakage volume flow VLKG, which is computed by a leakage input-output map 19 as a function of the set injection quantity QSL and the engine speed nMOT. The set injection quantity QSL in turn either can be computed by an input-output map as a function of the power output desired by the operator or corresponds to the correcting variable of a speed controller. In the first emergency operating mode NB1(A), the unlimited set volume flow VSLu(A) is computed as the sum of the output value of switch S1A, the set consumption VVb, and the rail pressure disturbance variable VSTG(A). The latter is computed in the first emergency operating mode. More exact explanation is provided in connection with FIG. 3.

If a defective rail pressure sensor and at the same time a defective pressure control valve are detected in the A-side common rail system, the second emergency operating mode NB2(A) is set. When the second emergency operating mode NB2(A) is set, switch S1A moves into position 1, and switch S2A switches to position 2. In this regard, see also FIG. 5. In position 2 of the switch S2A, the set current iSL(A) corresponds to an emergency operation current value iNB. The emergency operation current value iNB is selected in such a way that the passive pressure control valve is reliably opened (here: the A-side pressure control valve 9A (FIG. 1). If, as previously described, the A-side suction throttle is actuated in negative logic, then a constant value is output as the emergency operation current value, for example, iNB=0 A. Since the A-side suction throttle is now completely open, the A-side rail pressure pCR(A) successively increases until the A-side passive pressure control valve responds. If the A-side passive pressure control valve opens, the A-side rail develops a rail pressure pCR(A) that is dependent on the operating point of the internal combustion engine. During idling, for example, pCR(A)=900 bars and at full load pCR(A)=700 bars, i.e., a mean rail pressure pCR(A) of 800 bars. This mean rail Pressure is a very good approximation for emergency operating mode. However, opening of the A-side passive pressure control valve can also be effected if the set emergency operation current value iNB is set to a somewhat higher value, for example, iNB=0.4 A. This has the advantage that the greater fuel throttling does not lead to as much heating of the fuel as it is being redirected into the fuel tank.

If a defective rail pressure sensor is detected in the B-side common rail system, but the B-side pressure control valve continues to operate correctly, then the first emergency operating mode NB1(B) for the B-side common rail system is set, i.e., the switch S1B is switched to position 2. If a defective B-side rail pressure sensor and a defective B-side pressure control valve are simultaneously detected, then the second emergency operating mode NB2(B) is set for the B-side common rail system by switching the switch SIB to position 1 and the switch S2B to position 2. In this regard, see also FIG. 5.

FIG. 3 is a block diagram of the A-side closed-loop rail pressure control system 12A with an open-loop control system 20A. The open-loop control system 20A serves to adjust the A-side pressure control valve volume flow VDRV(A). The open-loop control system for the B-side pressure control valve is identical to the open-loop control system 20A, so that the description of the open-loop control system 20A applies equally to the open-loop control system of the B-side pressure control valve. The input variables of the open-loop control system 20A are: the engine speed nMOT, the set injection quantity QSL or a set torque MSL, the first emergency operation signal NB1(A), the input variable E1 for the conversion of the PWM signal PWMDV(A), and an input variable E2. The input variable E2 combines the set rail pressure pSL, the A-side actual rail pressure pIST(A), and the A-side dynamic rail pressure pDYN(A). The set injection quantity QSL either is computed by an input-output map as a function of the power output desired by the operator or corresponds to the correcting variable of a speed controller. The physical unit of the set injection quantity QSL is $mm^3$/stroke. In the case of a torque-based structure, the set torque MSL is used instead of the set injection quantity QSL. The output variables of the open-loop control system 20A are the pressure control valve volume flow VDRV(A), the set consumption VVb, and the rail pressure disturbance variable VSTG(A). The set consumption VVb and the rail pressure disturbance variable VSTG(A) are input variables of the A-side closed-loop rail pressure control system 12A.

Normal operating mode will now be described, in which the switches S3A, S4A, and S5A are in position 1. In this regard, see also FIG. 5, which shows the switch positions for the various operating modes. A computing unit 21A computes a set volume flow VSLDV(A) for the pressure control valve 11A as a function of the engine speed nMOT, the set injection quantity OSL, and the input variable E2. The computing unit 21A combines the computation of a static volume flow and a dynamic volume flow, the addition of the two volume flows, and limitation as a function of the A-side actual rail pressure pIST(A). The engine speed nMOT and the set injection quantity QSL are likewise used by the computing unit 26 to compute the set consumption VVb, which is one of the input variables of the closed-loop rail pressure control system 12A. The set volume flow VSLDV(A) of the pressure control valve is one of the input variables of a pressure control valve input-output map 22A. The second input variable is the A-side actual rail pressure pIST(A), since the switch S5A is in position 1. A set current iSLDV(A) of the pressure control valve 11A is computed as a function of the two input variables and then converted by a PWM computing unit 23A to the duty cycle PWMDV(A), with which the pressure control valve 11A is activated. Automatic current control, closed-loop current control system 25A with filter 24A, can be subordinate to this conversion. In this closed-loop current control system 25A, the controlled variable corresponds to the electric current that develops at the pressure control valve 11A. The output signal of the pressure control valve 11A represents the pressure control valve volume flow VDRV(A), i.e., the fuel volume flow that is redirected from the A-side rail into the fuel tank.

If a defective A-side rail pressure sensor is detected, but the A-side pressure control valve continues to operate correctly, then the first emergency operating mode NB1(A) for the A-side common rail system is set, so that the switches S3A, S4A, and S5A switch to position 2. In position 2 of the switch S3A, a set emergency operation volume flow VSLNB is one of the input variables of the pressure control valve input-output map 22A instead of the set volume flow VSLDV(A). The set emergency operation volume flow VSLNB is computed by an emergency operation input-output map 27 as a function of the set injection quantity QSL and the engine speed nMOT. The emergency operation input-output map 27 is realized in such a form that in the entire operating range of the internal combustion engine, a pressure control valve volume flow VDRV(A) greater than zero (VDRV(A)>0 liters/minute) is redirected from the rail into the fuel tank. The operating range of the internal combustion engine is understood to mean the speed range between the starting speed (idle speed) and the cutoff speed or between an idle torque and a maximum torque. The set emergency operation volume flow VSLNB is now also an input variable of the closed-loop rail pressure control system 12A, since the switch S4A occupies position 2, and thus the rail pressure disturbance variable VSTG(A) is equal to the set emergency operation volume flow VSLNB (VSTG(A)=VSLNB). In other words, in the case of a defective A-side rail pressure sensor and a correctly operating A-side pressure control valve, the set emergency operation volume flow VSLNB is the setpoint value for both the A-side pressure control valve 11A on the high-pressure side and the A-side suction throttle on the low-pressure side in the closed-loop rail pressure control system 12A. The second input variable of the pressure control valve input-output map 22A is now the set rail pressure pSL, since the switch S5A has moved into position 2. Therefore, the set current iSLDV(A) for the pressure control valve is computed by the pressure control valve input-output map 22A as a function of the set rail pressure pSL and the set emergency operation volume flow VSLNB. The conversion to the pressure control valve volume flow VDRV(A) is then carried out as previously described, previously If the second emergency operating mode NB2(A) is set in the A-side common rail system, this does not affect the switches S3A, S4A, and S5A, which remain in position 2. In this regard, see FIG. 5.

Figure 4:
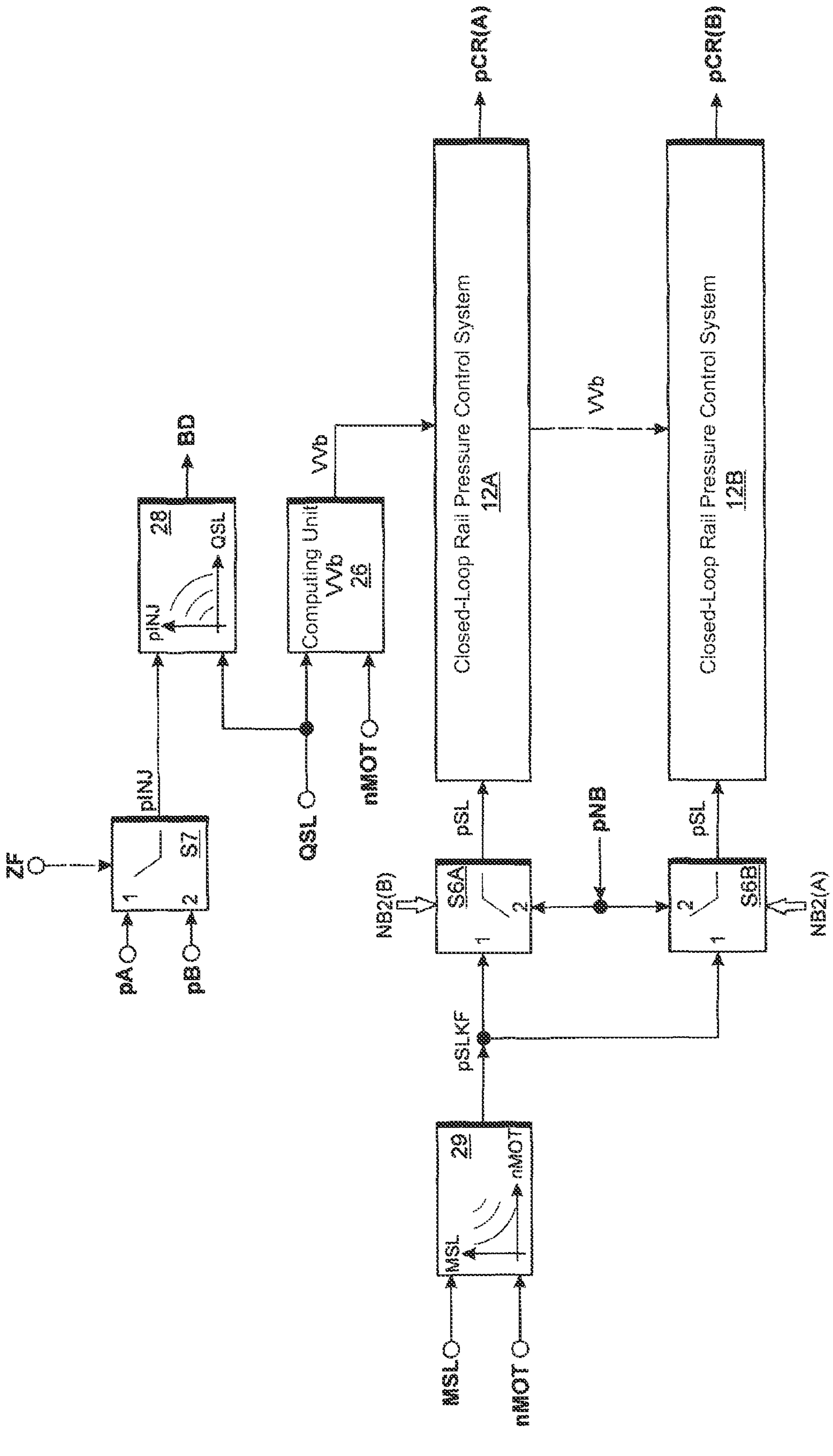
FIG. 4 shows the closed-loop rail pressure control systems with an injector input-output map.

FIG. 4 is a block diagram that shows the A-side closed-loop rail pressure control system 12A, the B-side closed-loop rail pressure control system 12B, and an injector input-output map 28. For the sake of completeness, this drawing again shows the computing unit 26, by which the set consumption VVb for the two closed-loop rail pressure control systems is computed as a function of the set injection quantity QSL and the engine speed nMOT. The input variables of the block diagram are the set torque MSL, the engine speed nMOT, the set injection quantity QSL, the firing order ZF, a pressure pA, and a pressure pB. The output variables of the block diagram are the energization time BD for actuating the injectors, the A-side rail pressure pCR(A), and the B-side rail pressure pCR(B). Further explanation will now be given in conjunction with FIG. 6, which shows the various failure possibilities for the two rail pressure sensors and the two pressure control valves.

The function of the block diagram will first be described for normal operating mode, in which the switches S6A and S6B are in position 1. In normal operating mode, the reference input of the A-side closed-loop rail pressure control system 12A is the set rail pressure pSL. The reference input of the B-side closed-loop rail pressure control system 12B is also the set rail pressure pSL. The set rail pressure pSL in turn is equal to the set input-output map rail pressure pSLKF, which is computed by the input-output map 29. The energization time BD is computed by the injector input-output map 28. The first input variable is the set injection quantity QSL. The second input variable is the pressure pINJ, which in turn is equal to the pressure pA or pB, depending on the position of the switch S7, which is switched as a function of the firing order ZF. In normal operating mode, the pressure pA corresponds to the A-side actual rail pressure pIST(A), and the pressure pB corresponds to the B-side actual rail pressure pIST(B). In FIG. 6, this corresponds to serial number 1.

If a defective A-side rail pressure sensor is detected, but the A-side pressure control valve continues to operate correctly, then the first emergency operating mode NB1(A) for the A-side common rail system is set. In the first emergency operating mode NB1(A) of the A-side common rail system, the pressure pA for the injector input-output map 28 corresponds to the set input-output map rail pressure pSLKF. The pressure pB continues to be the same as the B-side actual rail pressure pIST(B) if the B-side common rail system has no defects, i.e., if the B-side rail pressure sensor and the B-side pressure control valve are not defective. In FIG. 6, this corresponds to serial number 2. The opposite case is reproduced in FIG. 6 under serial number 3. If both the rail pressure sensor and the pressure control valve of the A-side common rail system are simultaneously defective, then the second emergency operating mode NB2(A) for the A-side common rail system is set. In the second emergency operating mode NB2(A), the pressure pA for the injector input-output map 28 is set to the rail pressure mean value pM, for example, 800 bars. Since the B-side common rail system is operating correctly, the pressure pB continues to be the B-side actual rail pressure pIST(B). In FIG. 6, this corresponds to serial number 7. If the A-side common rail system is in the second emergency operating mode NB2(A), a rail pressure in the range of 700 bars to 900 bars develops after the A-side passive pressure control valve 9A (FIG. 1) has opened. If the B-side common rail system is in normal operating mode, its rail pressure may be pCR(B) g≈2000 bars. The pressure difference between the two rails can cause torsional vibrations of the internal combustion engine. Therefore, an option is provided, in which the reference input of the intact common rail system is switched to an emergency operation rail pressure pNB, for example, pNB=1500 bars. In the previously described case, therefore, the switch S6B is switched to position 2. In this regard, see also FIG. 5, in which the switch S6B either remains in position 1 or is switched to position 2 if this option is to be applied.

If both common rail systems are in the second emergency operating mode, the pressure pA and the pressure pB for the injector input-output map 28 are set to the rail pressure mean value pM. This case is shown in FIG. 6 as serial number 16.

LIST OF REFERENCE NUMBERS

1 internal combustion engine
2 fuel tank
3A, B low-pressure pump
4A, B suction throttle, low-pressure side
5A, B high-pressure pump
6A, B rail
7A, B injector
8A, B rail pressure sensor
9A, B pressure control valve, passive
10 electronic control unit (ECU)
11A, B pressure control valve, high-pressure side
12A, B closed-loop rail pressure control system
13A, B filter
14A, B pressure controller
15A, B functional block
16A, B PWM signal computing unit
17A, B unit (suction throttle, high-pressure pump, and rail)
18A, B filter
29 leakage input-output map
20A, B open-loop control system
21A, B computing unit (set volume flow for the pressure control valve)
22A, B pressure control valve input-output map
23A, B PWM signal computing unit
24A, B filter
25A, B closed-loop current control system (pressure control valve)
26 computing unit (set consumption)
27 emergency operation input-output map
28 injector input-output map
29 input-output map

The invention claimed is:

1. A method for open-loop and closed-loop control of an internal combustion engine with an independent A-side common rail system and an independent B-side common rail system, the method comprising the steps of, in a normal operating mode, automatically controlling rail pressure in each common rail system by a suction throttle on a low-pressure side as a first pressure regulator in a closed-loop rail pressure control system; simultaneously acting on the rail pressure with a rail pressure disturbance variable by way of a pressure control valve on a high-pressure side as a second pressure regulator by a pressure control valve volume flow being redirected from the rail into a fuel tank by the pressure control valve on the high-pressure side; setting a first emergency operating mode for an affected of the common rail systems if a defective rail pressure sensor and a nondefective pressure control valve are detected in the affected common rail system; setting a second emergency operating mode for the affected common rail system if a defective rail pressure sensor and simultaneously a defective pressure control valve are detected in the affected common rail system; and wherein normal operating mode continues to be set for the other, nondefective of the common rail systems.

2. The method in accordance with claim 1, wherein in the first emergency operating mode, the pressure control valve on the high-pressure side and the suction throttle on the low-pressure side are activated in the affected common rail system as a function of a common setpoint value.

3. The method in accordance with claim 2, wherein the setpoint value corresponds to a set emergency operation volume flow, which is computed by an emergency operation input-output map as a function of a set injection quantity and engine speed.

4. The method in accordance with claim 3, wherein the emergency operation input-output map is realized in a form that in an entire operating range of the internal combustion engine, a pressure control valve volume flow is redirected from the rail into the fuel tank.

5. The method in accordance with claim 1, wherein in the second emergency operating mode, the suction throttle is activated in the affected common rail system so that the rail pressure is successively increased until a passive pressure control valve responds.

6. The method in accordance with claim 5, including, when the second emergency operating mode is set for the A-side common rail system, setting the set rail pressure of the correctly operating B-side common rail system to an emergency operation rail pressure, or when the second emergency operating mode is set for the B-side common rail system, setting the set rail pressure of the correctly operating A-side common rail system to the emergency operation rail pressure.

7. The method in accordance with claim 1, wherein in the normal operating mode, a switch is made, as a function of firing order, from the A-side actual rail pressure to the B-side actual rail pressure as an input variable of an injector input-output map for computing energization time of an injector; wherein when the first emergency operating mode for the A-side common rail system is set, while the B-side common rail system is operating correctly, a set input-output map rail pressure is set as the input variable instead of the A-side actual rail pressure; and wherein when the first emergency operating mode for the B-side common rail system is set, while the A-side common rail system is operating correctly, the set input-output map rail pressure is set as the input variable instead of the B-side actual rail pressure.

8. The method in accordance with claim 7, including, when the second emergency operating mode for the A-side common rail system is set, setting a rail pressure mean value as the input variable for the injector input-output map, and when the second emergency operating mode for the B-side common rail system is set, setting the rail pressure mean value as the input variable for the injector input-output map.

9. The method in accordance with claim 7, wherein the second input variable of the injector input-output map is the set injection quantity, which is computed by a speed controller as its correcting variable.

10. The method in accordance with claim 7, wherein the set injection quantity corresponds to an accelerator pedal position.

* * * * *